United States Patent Office 3,308,576
Patented Mar. 14, 1967

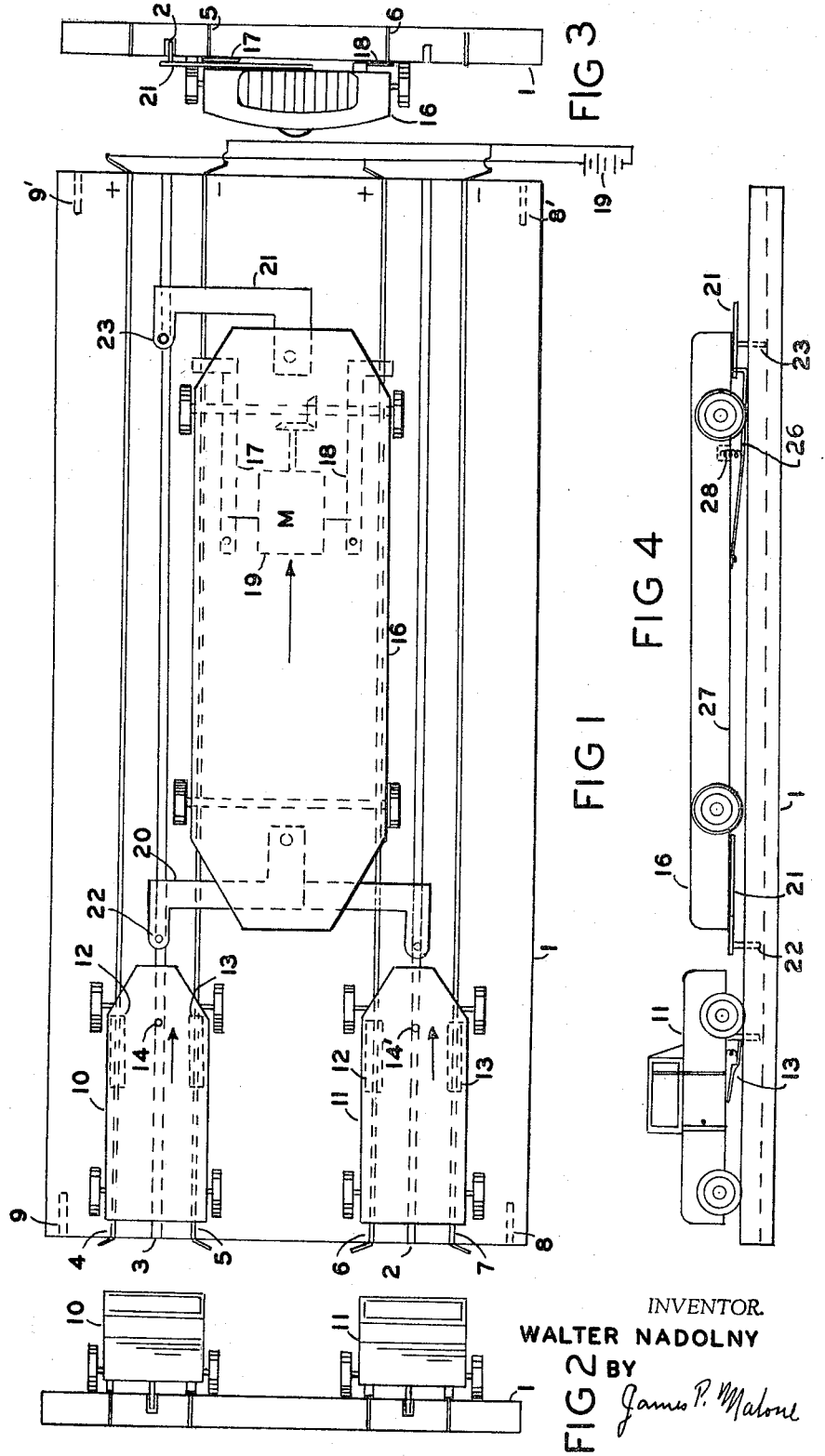

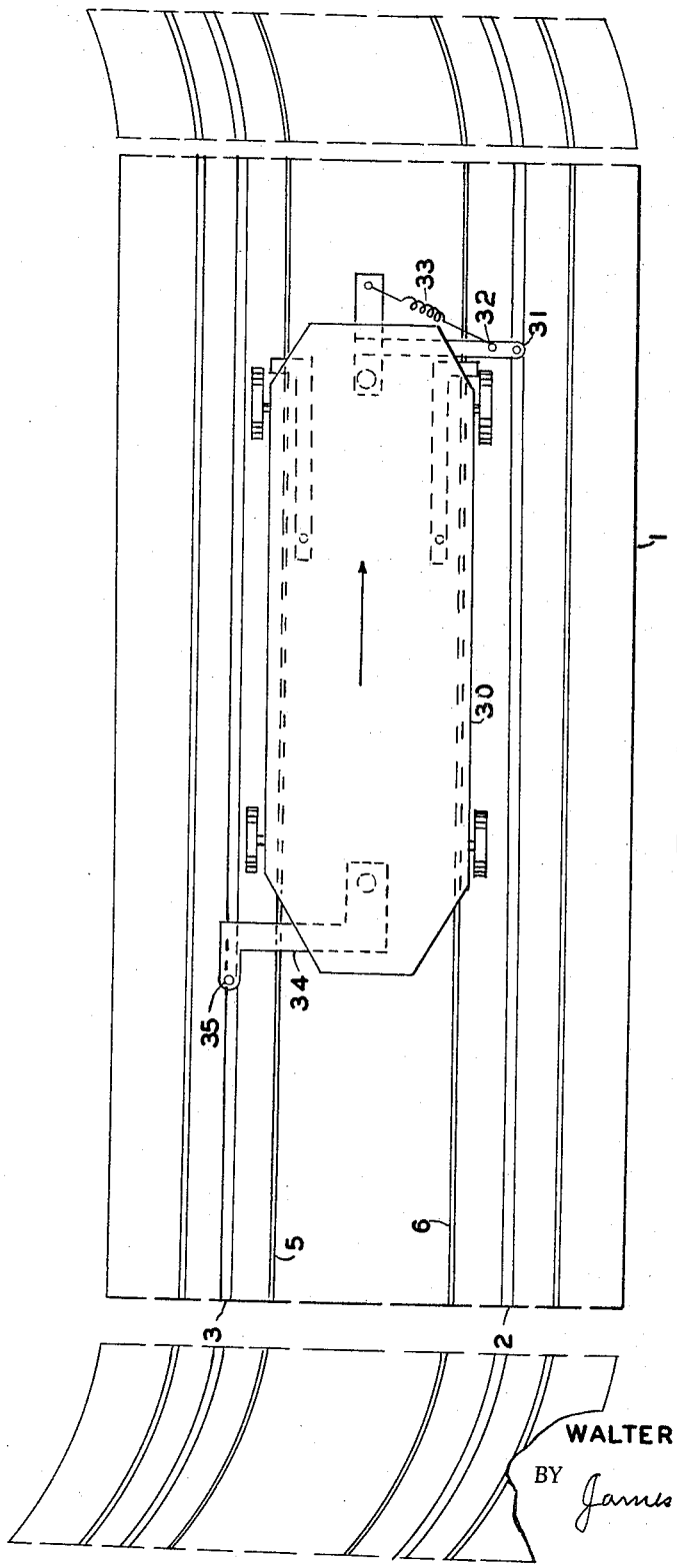

3,308,576
MOTOR VEHICLE AND DUAL TRACK
Walter Nadolny, 1089 Van Buren St.,
Uniondale, N.Y. 11553
Filed Mar. 2, 1964, Ser. No. 348,351
4 Claims. (Cl. 46—243)

This invention relates to model vehicle means and more particularly to model electrical automobile means of the type having a parallel pair of electrical tracks.

Conventional electrical model automobile systems generally have a parallel pair of tracks which are made out of a single molded plastic piece each track comprising a slot and a pair of electric rails spaced on either side of the slot. The electric rails are used to supply electric power to riding contacts which are connected to the vehicle motor and the slot is used to engage a pin on the vehicle for the purpose of keeping it on the track. The vehicles have rubber tires which ride on a smooth surface. These dual track systems are generally used for racing the vehicles.

The present invention is an improvement which permits the use of a large vehicle rather than two small vehicles, for instance the large vehicle might be a parade float. The large vehicle is adapted to ride along the center and received its electrical power from the two inner tracks. The large vehicle has guide pins set on extension arms which ride in one or more of the existing slots.

Accordingly, a principal object of the invention is to provide new and improved electrical model automobile systems.

Another object of the invention is to provide new and improved means to adapt existing electrical automobile systems of the type having two tracks with a small vehicle on each track, to a single track system for a large vehicle.

Another object of the invention is to provide means to permit different size vehicles to be driven on the conventional double track.

Another object of the invention is to provide means in a model electrical automobile system of the type having a parallel pair of tracks, each track comprising a slot and having a pair of electric rails spaced on either side of each slot, each slot being adapted to accommodate one small vehicle having a center guide pin riding in said slot and electric contacts riding on said electric rails on either side of said slots; means to adapt a large vehicle to ride between said slots and use said electric rails between said slots comprising; a first guide member connected to and extending from one side of said large vehicle, a second guide member connected to and extending from one side of said large vehicle, a pair of guide pins one pin connected to each of the said guide members, each of said pins being adapted to ride in one of said slots, and a pair of electric contact extension members each connected to one of said contacts to electrically connect said contacts to one of said inner rails located between said slots.

These and other objects of the invention will be apparent from the following specification and drawings of which:

FIGURE 1 is a plan view of an embodiment of the invention.

FIGURE 2 is a side view showing a pair of conventional small vehicles on the tracks.

FIGURE 3 is a side view showing the large vehicle of the present invention, on the same track.

FIGURE 4 is a detail sectional view of the large vehicle.

FIGURE 5 is a plan view of a modification of the invention.

Referring to the figures, the invention comprises a molded plastic section of track 1, which has a pair of slots 2 and 3, a first pair of electric rails 4 and 5 on either side of the slot 3 and a second pair of electric rails 6 and 7 on either side of the slot 2 all in parallel relation. The track section has pin holes 8, 8', 9, 9' at the ends thereof to engage guide pins to connect another section of track. The ends of the electric rail terminate in bent clips which contact the rails in the next section.

The tracks thus far described are conventional and are used for mounting a pair of small vehicles 10 and 11 which are also conventional, each of the small vehicles including a motor which is connected to two contacts 12 and 13 which ride on the electric rails 4 and 5. The small vehicles 10 and 11 also have center guide pins 14, and 14' which ride in the slots 3 and 2 respectively for the purpose of keeping the vehicles on the track. The wheels on the vehicles have rubber tires and are not otherwise guided.

The vehicle 16 of the present invention may be considerably larger than the small vehicles 10 and 11 and is adapted to ride in the center of the track section. The vehicle 16 has a pair of contacts 17 and 18 connected to a motor 19 which is connected to the front or rear wheels in a conventional manner. The contacts 17 and 18 ride on the rails 5 and 6, that is, the inner rail of each pair, which are connected to a source 19 of direct current polarized as shown in the drawings.

The large vehicle 16 has a pair of extension members 20 and 21 connected to its undercarriage which extend to one side of the vehicle.

At the ends of the extension members 20 and 21 are guide pins 22 and 23 which ride in the slot 3 as shown in FIGURE 1. Since the guide slot is on the side of the large vehicle 16 it is necessary to have two guide pins. If desired, additional extension members may be attached having guide pins to ride in the slot 2 or, as shown, the extension members 20 may extend to the slot 2. A single extension member extending to the side will not give sufficient guiding force to hold the large vehicle on its course.

The large vehicle may be of any size whose wheels will fit on the track section 1. The use of the large vehicles which may be floats or other vehicles will not interfere with the simultaneous use of the small vehicle providing equal speeds are maintained. The extension members 20 and 21 may be made of telescoping adjustable lengths so as to accommodate different size vehicles, and the contact members may also have adjustable extension members in order to adapt for different size vehicles.

FIGURE 4 shows a detail side view of the undercarriage of the large vehicle 16 showing how the contacts and guide pins are connected to the undercarriage. The contact 26 may be riveted or otherwise connected to the undercarriage 27 at one end and spring loaded by the spring 28 so that the other end of the contact rides on the electric rail 1. The extension members 20 and 21 are connected to the undercarriage of the large vehicle and have the guide pins 22 and 23 each riding in one of the slots in the track section 1.

FIGURE 5 shows a modification of the invention comprising a large type vehicle 30. The front guide pin 31 is mounted on the member 32 which is pivotally connected to the frame of vehicle 30. The member 32 is urged in the forward direction by the spring 33 and the member 32 is preferably mounted o the outside of the track loop. It has been found that this arangement gives the best stability on turns and permits high speed without the vehicle jumping off the track since the spring 33 takes up shock on the turns.

The rear guide member 34 and pin 35 preferably extend to the inside of the track. It is found that this arrangement of guide pins offers the best stability and safety features and is an important feature since these vehicles run at a relatively high speed.

Therefore, the present invention provides new and improved electrical model vehicles means by means of which it is possible to use the conventional type vehicle tracks for vehicles of much larger size.

Many modifications may be made by those who desire to practice the invention without departing from the scope thereof which is defined by the following claims:

I claim:

1. In a model electrical automobile system of the type having a parallel pair of tracks, each track comprising a slot and having a pair of electric rails spaced on either side of said slot, each track being adapted to accommodate one small vehicle having a center guide pin riding in said slot and electric contacts riding on said electric rails on either side of said slot;

means adapting a large vehicle having an electric motor to ride between said slots and use said electric rails between said slots comprising;

a first guide member connected to and extending from one side of said large vehicle, a second guide member connected to and extending from one side of said large vehicle, a pair of guide pins one pin connected to each of the said guide members, each of said pins being adapted to ride in one of said slots, and a pair of electrical contact members each connected to said motor and each adapted to contact one of said inner rails located between said slots.

2. Apparatus as in claim 1, wherein both said guide members extend from the same side of said large vehicle.

3. Apparatus as in claim 1, wherein said guide members extend from different sides of said large vehicle.

4. An electric vehicle system of the type having a parallel pair of tracks forming a closed loop, each track comprising a slot and having a pair of electric rails spaced on either side of said slot, each track being adapted to accommodate one small vehicle having a center guide pin riding in said slot and electric contacts riding on said electric rails on either side of said slot;

means to adapt a large vehicle having an electric motor to ride between said slots and use said electric rails between said slots comprising;

a first guide member pivotally connected to and extending from the forward side of said large vehicle toward the outside of said loop, a spring connected to urge said guide member in the direction of travel and toward said vehicle, a second guide member connected to and extending from the rearward side of said large vehicle toward the inside of said loop, a pair of guide pins one pin connected to each of the said guide members, each of said pins being adapted to ride in one of said slots, and a pair of electric contact members each connected to said motor and each adapted to contact one of said inner rails located between said slots.

References Cited by the Examiner

UNITED STATES PATENTS

| | | |
|---|---|---|
| 2,703,534 | 3/1955 | Copeland. |
| 3,159,109 | 12/1964 | Braverman _____ 46—243 |
| 3,206,122 | 9/1965 | Frisbie et al. _____ 104—149 X |

RICHARD C. PINKHAM, *Primary Examiner.*

DELBERT B. LOWE, *Examiner.*

R. F. CUTTING, *Assistant Examiner.*